(12) United States Patent
Baten et al.

(10) Patent No.: US 8,433,050 B1
(45) Date of Patent: Apr. 30, 2013

(54) OPTIMIZING CONFERENCE QUALITY WITH DIVERSE CODECS

(75) Inventors: Benjamin J. Baten, Westminister, CO (US); Luke A. Tucker, Beacon Hill (AU)

(73) Assignee: Avaya Inc., Basking Ridge, NJ (US)

( * ) Notice: Subject to any disclaimer, the term of this patent is extended or adjusted under 35 U.S.C. 154(b) by 1934 days.

(21) Appl. No.: 11/348,668

(22) Filed: Feb. 6, 2006

(51) Int. Cl.
*H04M 3/42* (2006.01)

(52) U.S. Cl.
USPC ..................... 379/202.01; 375/219

(58) Field of Classification Search ............ 375/242, 375/340, 341, 355, 262, 265; 348/14.01–14.08
See application file for complete search history.

(56) References Cited

U.S. PATENT DOCUMENTS

| | | | |
|---|---|---|---|
| 4,791,660 A | 12/1988 | Oye et al. | |
| 4,969,040 A * | 11/1990 | Gharavi | 375/240.11 |
| 5,164,992 A | 11/1992 | Turk et al. | |
| 5,280,561 A | 1/1994 | Satoh et al. | |
| 5,506,872 A | 4/1996 | Mohler | |
| 5,675,376 A | 10/1997 | Andersson et al. | |
| 5,710,729 A * | 1/1998 | Feste et al. | 708/313 |
| RE36,041 E | 1/1999 | Turk et al. | |
| 5,867,529 A * | 2/1999 | Cole | 375/242 |
| 5,964,708 A * | 10/1999 | Freeman et al. | 600/447 |
| 5,986,703 A | 11/1999 | O'Mahony | |
| 6,195,384 B1 * | 2/2001 | Dagdeviren | 375/242 |
| 6,507,356 B1 | 1/2003 | Jackel et al. | |
| 6,549,569 B1 * | 4/2003 | Beyda et al. | 375/242 |
| 6,574,469 B1 | 6/2003 | Xiang et al. | |
| 6,594,306 B1 * | 7/2003 | Mehrabanzad et al. | 375/242 |
| 6,721,712 B1 | 4/2004 | Benyassine et al. | |
| 6,731,734 B1 * | 5/2004 | Shaffer et al. | 379/202.01 |
| 6,753,900 B2 | 6/2004 | Runcie et al. | |
| 7,158,572 B2 * | 1/2007 | Dunne et al. | 375/242 |
| 7,266,148 B2 * | 9/2007 | Kim | 375/240.03 |
| 7,486,719 B2 * | 2/2009 | Ozawa | 375/219 |
| 7,558,463 B2 * | 7/2009 | Jain et al. | 386/252 |
| 2002/0061131 A1 | 5/2002 | Sawhney et al. | |
| 2002/0113862 A1 | 8/2002 | Center, Jr. et al. | |
| 2003/0063569 A1 * | 4/2003 | Kalliokulju et al. | 370/252 |
| 2004/0174936 A1 * | 9/2004 | Qiu et al. | 375/242 |
| 2004/0252676 A1 | 12/2004 | Bye | |
| 2008/0205566 A1 * | 8/2008 | MacInnis et al. | 375/355 |
| 2010/0104049 A1 * | 4/2010 | LeBlanc et al. | 375/355 |

FOREIGN PATENT DOCUMENTS

| | | |
|---|---|---|
| EP | 0 118 182 | 9/1985 |
| JP | 401221086 A | 9/1989 |
| JP | 404344788 A | 12/1992 |
| WO | 00/72560 A1 | 11/2000 |

OTHER PUBLICATIONS

U.S. Appl. No. 10/459,182, filed Jun. 10, 2003, Chan et al.
U.S. Appl. No. 10/941,199, filed Sep. 14, 2004, Beck.
U.S. Appl. No. 10/949,781, filed Sep. 24, 2004, Lang et al.
U.S. Appl. No. 11/025,493, filed Dec. 28, 2004, Chan et al.

(Continued)

*Primary Examiner* — Curtis Kuntz
*Assistant Examiner* — Maria El-Zoobi
(74) *Attorney, Agent, or Firm* — Sheridan Ross P.C.

(57) ABSTRACT

The present invention is directed toward a method and system for maintaining a high quality teleconference. The system provides a way of allowing participants of a conference call to experience the call according to the highest quality codec that their endpoint supports.

22 Claims, 5 Drawing Sheets

OTHER PUBLICATIONS

U.S. Appl. No. 11/080,763, filed Mar. 14, 2005, Coughlan et al.
U.S. Appl. No. 11/105,604, filed Apr. 13, 2005, Ohrstrom Sandgren et al.
CDM Optics, "Image Gallery," (2001).
Cisco Systems—Survivable Remote Site IP Telephony, Copyright 1992-2003, Cisco Systems, Inc., http://www.cisco.com/warp/public/cc/pd/unco/srstl, 1 page.
Cisco Systems Overview—Cisco IOS Telephony Services: Survival Remote Site Telephony, "Now Cost-Effectively Extend Cisco CallManager IP Telephony and High Productivity Applications to Small Branch Office Sites" Copyright 2001, Cisco Systems, Inc., pp. 1-4.
Cisco Solutions Guide—"Survivable Remote Site Telephony Cisco 2600/3600 Voice Technical Marketing" Copyright 1992-2001, Cisco Systems, Inc., http://www.cicso.com/warp/public/cc/pd/unco/srstl/tech/demha_sg.htm (21 pages).
Cisco Systems, Inc., "Cisco VT Advantage Video Telephony Solution," (1992-2004), pp. 1-6.
Cisco Systems Solutions Guide—"Survivable Remote Site Telephony Cisco 2600/3600 Voice Technical Marketing" Copyright 1992-2001, Cisco Systems, Inc., pp. 1-19.
Cisco Systems White Paper—"Ensuring IP Telephony High Availability in the Branch Office, Now Cost-effectively Extend Cisco CallManager IP Telephony to Small Branch Office Sites Using Cisco Survivable Remote Site Telephony" Copyright 1992-2005, Cisco Systems, Inc., http://www.cisco.comlen/us/products/sw/voicesw/ps2169/products_white_paper09186a008 . . . (5 pages).
Digibird.com, "Essential Optics for Digiscoping," (2002), available at http://www.digibird.com/primerdir/primer0.htm, 4 pages.
Eisert, Peter, "Immersive 3-D Video Conferencing: Challenges, Concepts, and Implementations," Proc. SPIE Visual Communications and Image Processing (VCIP), Lagano, Switzerland (Jul. 2003), 11 pages.
Fintzel et al., "Real Time 3D Navigation in a Static Virtualzied Scene from a Limited Set of 2D Data," IEEE—Int'l Conf. on Multimedia & Expo 2000, New York, Electronic Proceedings, 11 pages.
Imagis Technologies Inc. News Release, "Imagis Technologies Releases Major Upgrade to Face Recognition Software," (Sep. 2002).
Jun, Song F. et al., *Optical Feature Recognition*, (Mar. 6, 1995), 1 page.
Kawato et al., *Image and Vision Computing*, "Detection and Tracking of Eyes for Gaze-camera Control," 22(12):1031-1038, Mar. 2004.
LMS, Blind Source Separation, 4 pages at http://www.Int.de/LMS/research/projects/BSS/index.php?lang=eng, printed Dec. 29, 2004.
Lucent Technologies Merlin Legend Communications System, Release 6.1, Network Reference, 555-661-150 Comcode 108289703; Issue 1, Aug. 1998; 369 pages.
Mark et al., "Post-Rendering 3D Warping", In Proceedings of 1997 Symposium on Interactive 3D Graphics, Providence, RI, Apr. 27-30, 1997, pp. 7-16.
Marpe et al., "Video Compression Using Context-Based Adaptive Arithmetic Coding," Proc. IEEE International Conference on Image Processing (ICIP'01), vol. III, pp. 558-561, Oct. 2001.
Nikon MicroscopyU: Interactive Java Tutorials website, "Digital Camera Resolution Requirements for Optical Microscopy," (2000-2004), available at http://www.microscopyu.com/tutorials/java/digitalimaging/pixelcalculator, 4 pages.
"Nordic Guide to Video Telephony and Video Relay Service," The Nordic Forum for Telecommunication and Disability 2002, NFTH Mar. 2002, pp. 1-14.
Oshima, Shigeru, "Acquisition: Fundamental Optics of Television Camera Lenses," shortened version of the Fundamental Optics section in *Canon Guidebook of Television System Optics ($2^{nd}$ Ed.)*, (Jan. 2000), 13 pages.
Peter Kauff Projects, "BS-Immersive Media & 3D Video Group," (Ed. Christoph Fehn, Nov. 12, 2002), 6 pages.
Sanyo Electric Co., Ltd., "Character and Image Recognition Technology," Technology R&D Headquarters (2003), available at http://www.sanyo.co.jp/R_and_D/english/theme/c-2.html, 2 pages.
Soongsathitanon, Somphob, et al., University of Newcastle upon Tyne, "A New Orthogonal Logarithmic Search Algorithm for Fixed Block-Based Motion Estimation for Video Coding," date unknown, 4 pages.
The Imaging Source website, "Introduction to Optics and Lenses," (2003), available at http://www.theimagingsource.com/prod/opt/opticsintro_2.htm, 10 pages.
Toshiba Corporation Press Release, "Toshiba Announces World's First Image Recognition LSI for Intelligent Vehicle System," (Feb. 6, 2001), available at http://www.toshiba.co.jp/about/press/2001_02/pr0602.htm, 3 pages.
Wolberg, George, "Digital Image Warping," IEEE Computer Society Press Monograph (Mar. 4, 2002), available at http://www-cs.ccny.cuny.edu/~wolberg/diw.html, 7 pages.

\* cited by examiner

| Participant ID | Codec |
|---|---|
| 1xxxx | G.722 |
| 2xxxx | G.729 |
| 3xxxx | GSM |
| ⋮ | ⋮ |
| Nxxxx | G.722 |

OPTIMIZING CONFERENCE QUALITY WITH DIVERSE CODECS

FIELD

The invention relates generally to facilitating conference calls and enhancing conference call quality.

BACKGROUND

In a communication network, it is desirable to provide conference arrangements whereby many participants can be bridged together on a conference call. A conference bridge is a device or system that allows several communication endpoints to be connected together to establish a communications conference. Modern conference bridges can accommodate both voice and video data, thereby allowing, for example, collaboration on documents by conference participants.

Historically, however, the conferencing experience has been less than adequate, especially for conferences with many attendees. Each attendee of a conference call is typically connected with the conference bridge by a different type of endpoint. Some endpoints may be older phones that do not utilize any relatively new technologies. Other endpoints might be state-of-the-art communication devices. This disparity between communication devices leads to a lesser quality communication experience for the endpoints that could otherwise have received higher quality signals.

Devices and methods exist that can transform analog voice signals into digital signals suitable to pass across a communication network and then retransform the digital signals back into an analog signal for another person to hear. The device or program that is capable of performing the above-described compression/decompression and encoding/decoding steps is known as a codec (or endec in the case of hardware). Codecs can both put the stream or signal into an encoded form (often for transmission, storage, or encryption) and retrieve, or decode, that form for viewing or manipulation in a format more appropriate for these operations.

Codecs are generally used in teleconferencing and videoconferencing and streaming media applications. In a videoconferencing environment, a video codec converts analog video signals from a video camera to digital signals for transmission over digital circuits. It then converts a digital signal back to an analog signal for display. In an audio conferencing environment, an audio codec converts an analog audio signal to a digital signal for transmission over a digital circuit. It then converts the digital signals back to analog signals for reproduction. Codecs may also be used in both cases to further compress the signal for transmission. This additional compression saves bandwidth on a communication network for other signals to pass across. The purpose of this type of codec is to reduce the size of digital audio samples and video frames to speed up transmission and save storage space.

Codec algorithms may be implemented entirely in software, in which case a server, or the like, does all of the processing or this may also be done in hardware/firmware for faster processing. As audio and video signal processing techniques have developed, so too have the codec algorithms used to transmit audio and video signals. The result is that many different codecs exist and each of these codecs have unique operating parameters that affect the quality of a signal as heard by an end user.

One example of these codecs is the G.711 codec which samples at 8 kHz and is a standard to represent either a 13 bit or 14 bit, depending whether the mu-law or a-law variant is used, as 8 bit compressed Pulse Code Modulation (PCM). The G.711 codec creates a 64 kbit/s bitstream. The G.711 codec has been the industry standard and typically signals are transcoded to the G.711 codec because almost all network components are G.711 compatible.

Other examples of codecs include the G.722 codec which operates at about 64 kbit/s and samples audio data at a rate of 16 kHz; the G.729 codec which operates at 8 kbit/s and samples at 8 kHz; and the G.723.1 which operates at 8 kHz and uses a bandwidth between 5.3 and 6.3 kbit/s. Many codecs have several variants that provide different types of compression/decompression schemes. By way of example, there are extensions to the G.729 codec, which provide also 6.4 bkit/s and 11.8 kbit/s rates for marginally worse and better speech quality, respectively. As can be appreciated, there exist many other types of codecs that are available for commercial use, including speech codecs like, GSM, DV Audio, G.728, G.726, ACELP.net, and ACELP.wide audio codecs like AAC, WMA, MP3, ACELP.live, and AIFF and video codecs like MPEG, AVI, WMV, H.261, H.263, and H.264.

The quality of most speech codecs are rated according to Mean Opinion Scores (MOS). The MOS scores range from 1 to 5, with 5 being the highest possible quality of a voice signal. According to the MOS scores the G.711 codec is better than the G.729 codec, which are both better than the G.723.1 codec. The G.722 codec is an extremely high quality codec due to its wide bandwidth and faster sampling frequency. The G.722 codec is not yet rated by a MOS score, but the quality of the G.722 codec is considered superior to all of the above listed codecs.

Typical conference bridges support multiple types of communication devices by setting the conference quality equal to the lowest quality codec or by transcoding each signal to the G.711 codec. The bridge essentially requires every communication device to agree on a common operating codec. This ensures that every communication device can hear and be heard during the conference call. Unfortunately, this may require the highest quality enabled participants of a conference call to participate using a lower quality codec. Essentially, the new technology in the higher quality communication device is superfluous during a conference with a communication device only enabled with lower quality codecs.

The real problem is that one low quality communication device can degrade the conference call experience for every other participant of the conference, even if every other participant can use a higher quality communication device. Under typical conference call setups, if a communication device using a high quality codec is speaking, and one participant in the conference call is using a lower quality codec, all other participants, regardless of the codec their communication device uses, must listen to the signal at the lowest quality codec. There exists a need to allow participants of a conference call to experience the conference call according to the best available codec, not according to the participant with the worst quality codec or transcoding to a common lower quality codec.

There have been some attempts to address this problem. Namely, in U.S. Pat. No. 6,731,734 to Shaffer et al., which is herein incorporated by this reference, a multipoint control unit is described that allows for dynamic codec selection. Essentially, codecs are assigned to each endpoint in a conference call based upon optimizing objectives as determined by the multipoint control unit or its operator. When a conference call is set up, the multipoint control unit forces every participant to participate using a particular codec. If the objectives change, or another caller joins the conference, the multipoint control unit initiates a renegotiation of codecs for every single endpoint. This configuration may lead to a misuse of processing capabilities, because every time a new person joins the conference, the multipoint control unit is required to re-compute every endpoint's codec that should be used based upon the objectives of the multipoint control unit. This can become quite cumbersome if there are many participants and several of them are joining and leaving the conference at random. The computational load placed on the conference bridge has not decreased due to this configuration and every participant is not guaranteed of receiving the highest quality voice signal it can.

SUMMARY

The present invention is directed to an architecture allowing different endpoints to use different codec qualities during a multi-party communication session, such as a multi-party conference call. "Codec quality" refers to the degree to which the reproduced signal (i.e., the signal produced from decoding of an encoded original signal) represents the original signal. Stated another way, codec quality is inversely proportional to the degree of variance of the reproduced signal from the original signal. A greater variance corresponds to lower codec quality; the smaller the variance the higher the codec quality. Most speech and audio codec quality is rated according to MOS scores as noted above. Video codec quality is also usually based upon the quality of representation of the original signal by the reproduced signal. Different codec designations have different codec qualities. Examples of codec designations for speech codec include G.722, G.723, G.726, G.729, G.728, G.723.1, G.711, GSM, iLBC, Speex, DV Audio, ACELP.net, ACELP.wide, and their variants; for audio codec designations include AAC, WMA, MP3, ACELP.live, AIFF, and their variants; and for video codec designations include MPEG, AVI, WMV, H.261, H.263, H.264, and their variants.

In a first embodiment of the present invention, a signal processing method is provided that includes the steps:

(a) for each endpoint participating in a multi-endpoint communication session, selecting a quality of codec that the selected endpoint is enabled to use (e.g., at least first, second, and third endpoints to the session have selected first, second, and third codecs, respectively, and the first, second, and third codecs having, respectively first, second and third qualities, with the second quality being higher than the first and third qualities);

(b) receiving a first signal from the first endpoint using the first codec;

(c) converting the received signal to provide a normalized signal having one or more characteristics that at least match one or more corresponding characteristics of the second codec (e.g., the normalized signal has the same sampling frequency, bandwidth, and/or quantization as a signal output by the second codec); and (d) forwarding to the third endpoint a third signal derived from the normalized signal, the third signal having one or more characteristics of the third codec.

In a second embodiment, a signal processing method includes the steps:

(a) for each endpoint participating in a communication session, selecting a quality of codec that the selected endpoint is enabled to use;

(b) receiving a first signal from the first endpoint using the first codec;

(c) up-sampling the received signal to provide an up-sampled signal having a sampling frequency that at least matches the sampling frequency of the second quality; and (d) forwarding to the second endpoint the up-sampled signal and/or a down-sampled version thereof.

In one configuration, the conference signal summation is performed at the highest sample rate and bandwidth of all encoded signals that are terminated on a conference bridge. The highest bit rate/bandwidth signal is the normalized signal. All received encoded signals from voice endpoints are decoded at the bridge and, if necessary, converted to the normalized signal by up-sampling. The up-sampling takes the sampling rate from, for example, 8 KHz to 16 KHz in the case of G.711 and G.722 signals. Missing samples are inserted as 0 or null values, and an anti-aliasing filter is used to provide the resulting signal (i.e., interpolate the null samples properly into the signal). After summation of the normalized signals, the resulting signals are, if necessary, down-sampled and encoded in the desired format for transmission from the bridge towards the voice endpoints. In the above example, down-sampling removes every second sample and an anti-aliasing filter is used to ensure signal integrity in the case of moving, for example, from 16 KHz (G.722) to 8 KHz (G.711).

In this configuration, the conferencing experience of the users depends on their respective device's codec quality. When all parties in the conference are enabled to use the same best codecs, every endpoint experiences the best possible quality. When some parties are added to the conference and have devices using the same or a lower quality codec, any conversation between parties with the higher quality codec is experienced by those users at the maximum quality while parties with the lower quality codec hear the conversation at their quality level. Conversations between parties using the lower quality codecs are heard by those parties at their codec quality level, but the parties with higher quality codecs hear the quality level of the lower quality signal. This configuration is particularly advantageous in pure Voice over Internet Protocol or VoIP and mixed VoIP-Time Division Multiplexed or TDM networks.

The present invention can have a number of advantages. Current voice conferencing schemes force all conference endpoints to use G.711 by codec negotiation via the signaling protocol for speech encoding or to have to agree on the common denominator codec for voice conferencing. In contrast, the present invention can permit codecs with different qualities to be used in the same conference call. For example, parties on a local area network can use the highest possible quality voice codecs because the bandwidth usage is in general of no concern. Parties using a wide area network link can use a lower quality codec if bandwidth usage is a concern. The proposed invention can also allow endpoints with different supported codec sets in the same conference without having to force everyone to use G.711 or transcode lower quality codec encoded signals into G.711. In summary, embodiments of the present invention can allow all conferencing parties to experience the highest possible quality that their endpoint supports without forcing all parties to a lowest common denominator conference quality.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system having a conference bridge or other similar conferencing hardware/software, the invention is not limited for use with any particular type of communication system or configuration of system elements. Those skilled in the art will recognize that the disclosed techniques may be used in any communication application in which it is desirable to maintain a high signal quality for every participant in a conference call.

Figure 1:
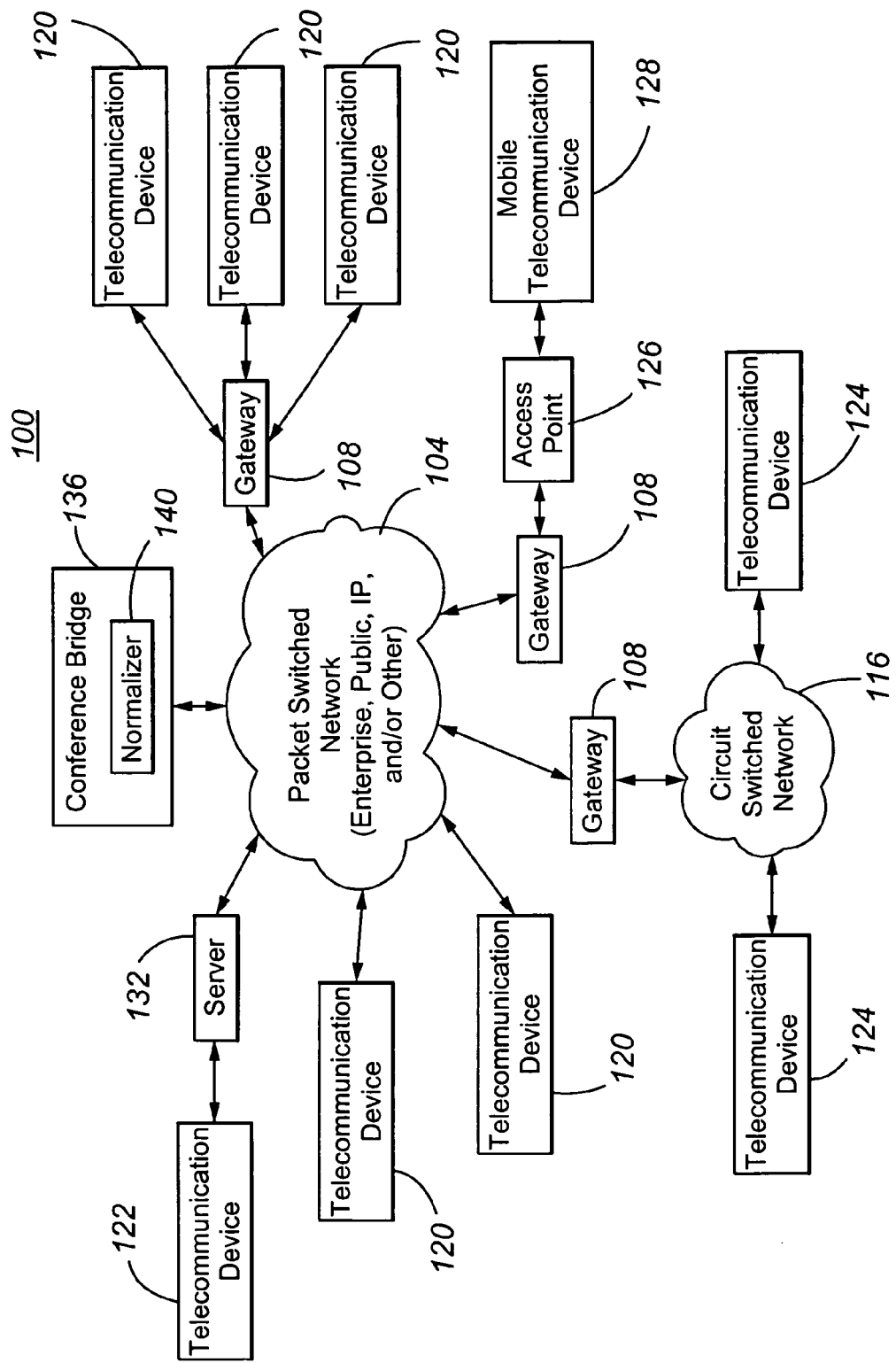
FIG. 1 is a block diagram depicting a communication network in accordance with embodiments of the present invention.

Referring initially to FIG. 1, an exemplary communication network 100 will be described in accordance with embodiments of the present invention. The communication network generally comprises a packet switched network 104, gateways 108, a circuit switched network 116, a plurality of telecommunication devices 120 and 124, one or more wireless access points 126, one or more mobile telecommunication devices 128, an enterprise server 132, and a conference bridge 136.

The packet-switched network 104 is in communication with an external first type of telecommunication device 120 either directly or via a gateway 108, and the circuit-switched network 116 with an external second type of telecommunication device 124. These telecommunication devices are referred to as "external" in that they are not directly supported as telecommunication device endpoints by a switch or server. The telecommunication devices 120, 124, and 128 are examples of devices more generally referred to herein as "external endpoints."

The packet-switched network 104 can be any data and/or distributed processing network, such as the Internet or an enterprise network. The network 104 typically includes proxies (not shown), registrars (not shown), and routers (not shown) for managing packet flows.

The first types of telecommunication devices 120 are packet-switch enabled and can include, for example, IP hardphones such as the Avaya Inc.'s 4600 Series IP Phones™, IP saphones such as Avaya Inc.'s IP Softphone™, Personal Digital Assistants or PDAs, Personal Computers or PCs, laptops, packet-based H.320 video phones and conferencing units, packet-based voice messaging and Interactive Voice Response (IVRs), and packet-based traditional computer telephony adjuncts.

The second type of telecommunication devices 124 have circuit-switching interfaces. The second type of telecommunication devices can include, for example, wired and wireless telephones, PDAs, H.320 video phones and conferencing units, voice messaging and response units, and traditional computer telephony adjuncts.

The server 132 is part of an enterprise network that includes a third type of telecommunication device 122. The term "server" as used herein should be understood to include a PBX, an ACD, an enterprise server, an IVR server, or other type of communications system server, as well as other types of processor-based communication control devices such as media servers, computers, adjuncts, etc. The telecommunication device 122 is "internal" in that it is directly supported as a telecommunication device endpoint by the switch/server 132. The telecommunication device 122 is an example of a device more generally referred to herein as an "internal endpoint." The telecommunication device 122 can be any of the communication devices mentioned above as possible external endpoints.

In addition to the devices noted above, the internal and external endpoints can include other types of communication devices. For example, personal computers, laptops, video cameras, digital cameras, and the like may all be considered endpoints.

A gateway 108 may also connect one or more mobile telecommunication devices 128 to the packet switched network 104. An access point 126 services the mobile telecommunication devices 128, which are also external endpoints.

The gateway 108 is positioned between various components and the packet-switched network 104 to provide communications passing between each of the components and the network 104. A gateway 108 may process communications between a telecommunication device 120 and the packet switched network for example. A gateway may also be used to process communications between the packet switched network 104 and the circuit switched network 116.

Referring to FIG. 1, the gateway 108 can be any suitable gateway device, such as Avaya Inc.'s, G700™, G600™, MCC/SCC™ media gateways and may be implemented as hardware such as via an adjunct processor (as shown) or as a chip (e.g., hardware, software, and combinations thereof) in a server.

Users of the external endpoints may wish to communicate with one another across the communication network 100. In the event that a simple point-to-point connection is desired, the two subject endpoints are directly connected by hardware within the communications network 100 and a single duplexed communication path is established. However, when several users of the external endpoints wish to conference with each other simultaneously, a conference bridge 136 is typically employed. The conference bridge 136 connects each channel from each endpoint participating in the conference call such that every participant of the conference call can hear what any one of the other participants is saying at a given time. This is accomplished by a number of mechanisms. One such mechanism is the received signals from every endpoint are summed together into a single outgoing signal for each participant. The signal on the bridge 136 received from each participant is typically never added to (or subtracted from) the summed signal from the summed signal that a given participant will receive. Specifically, if three parties A, B, and C are joined in a conference call, the signals from parties A and B are summed and sent to party C, the signals from parties A and C are summed and sent to party B, and the signals from parties B and C are summed and sent to party A. A further explanation of this mechanism can be found in U.S. Pat. No. 5,280, 561 to Satoh et al., which is herein incorporated by this reference. This ensures that each participant hears the other participants without listening to him or herself.

Another way this is accomplished is that the conference bridge 136 may include software and/or hardware that can determine what parties are speaking and automatically sends that signal to all other participants of the conference call. The determination can be made for instance by voice recognition software, channel activity detection, or the like. This requires a little more processing power in the conference bridge and is used less frequently for this reason, especially in smaller bridges.

The conference bridge 136 includes a normalizer 140. The normalizer 140 provides a way for every party of a conference to experience the conference at the highest possible quality, depending on the type of endpoint the recipient is using and the type of endpoint the sender has. The normalizer 140 eliminates the need for all parties of the conference to resort to the lowest common codec. The normalizer 140 normalizes the signals from the participants such that all signals can be summed and/or selected together without quality reduction. Then, the normalizer 140, after encoding, retransmits the summed signal back to each respective endpoint.

As can be appreciated, the normalizer 140 may also be implemented in or as an adjunct to the enterprise server 132, a conference bridge connected to the circuit switched network 116, at a gateway 108, at an endpoint 120, 122, 124, and/or 128 (mixer at the endpoint), at an IP enabled Private Branch Exchange (PBX), Interactive Voice Recognition or IVR unit, messaging systems, media server, etc. Essentially, the number of participants, and thus the required processing power, may determine the location of the normalizer 140. For example, if a conference only consists of three participants, the normalizer 140 may be employed at or as an adjunct to the enterprise server 132 or a mixer located at an endpoint. If there are thirty participants however, much more processing power will be required to facilitate the conference call, and thus the normalizer 140 may be employed at the conference bridge 136.

It should be emphasized that the configuration of the switch, server, user telecommunication devices, and other elements as shown in FIG. 1 is for purposes of illustration only and should not be construed as limiting the invention to any particular arrangement of elements.

Figures 2, 3:
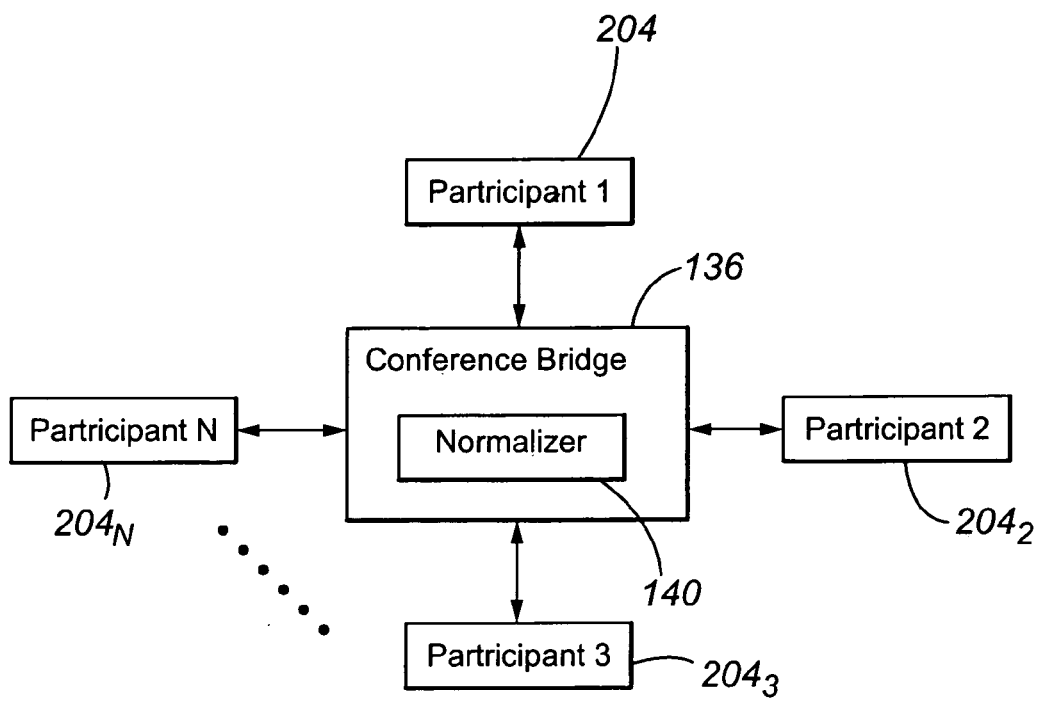
FIG. 2 is a block diagram depicting a conference between multiple users in accordance with embodiments of the present invention.
FIG. 3 is a representation of a codec to participant data structure employed in accordance with embodiments of the present invention.

Referring now to FIGS. 2 and 3, a conference between multiple participants 204 will be described in accordance with embodiments of the present invention. Typically, a conference is created when three or more participants wish to communicate with one another simultaneously (related to endpoint). In the depicted embodiment, N participants $204_{1-N}$ (where typically N>2) are conferencing via the conference bridge 136. As noted above, the conference bridge 136 provides a common connection between all participants $204_{1-N}$ of the conference. Having each participant 204 connect to the conference bridge 136 independently is a common way to set up a conference. Each participant 204 is connected to the conference bridge 136 through their own channel. The conference bridge 136 determines what types of codecs are available for use by each participant's external endpoint. For example, the first participant $204_1$ may be connected to the conference bridge via a phone that is set up to use G.722, G.729, G.723.1, or G.711 codecs. Whereas the second participant $204_2$ may be connected to the conference bridge via a slightly older phone that can use the same codecs as the first participant's $204_1$ phone with the exception of the G.722 codec. Additionally, the third participant may be connected to the conference bridge via a mobile telecommunication device that is only enabled with a GSM codec. The conference bridge 136 determines the best available codec for each participant and, possibly after some type of codec negotiation, creates a data structure 300 that maps the participant to his or her best available type of codec. The participant 204 may be identified in the data structure participant ID field 304 by IP address, a randomly assigned serial number, channel number, or any other identifier that is unique to the conference call. The codec that each participant will use is dynamically selected by the conference bridge 136 and stored in the codec field 308. The codec selected is preferably the highest quality codec for the corresponding communication device. Although different codecs are shown for a number of participant identifiers, it is to be understood that the same codec can be selected for any number of participant identifiers. As can be appreciated, a first codec may be used for transmission of signals from a given endpoint and the first codec may be used for reception of the signals at a given endpoint. Alternatively, a first codec may be used for transmission of signals from a given endpoint and a second different codec may be used for reception of signals at a given endpoint Once the conference bridge 136 determines the codecs that are to be used during the conference for each participant 204, the normalizer 140 is configured such that each participant 204 can communicate with all other participants at the highest possible quality. For example, assuming each participant is using the same codec to receive and transmit messages, the first participant $204_1$ will be communicating with the conference bridge using the G.722 codec, the second participant $204_2$ will be communicating using the G.729 codec and the third participant $204_3$ will be communicating using the GSM codec. Whenever, the third participant speaks, the other participants will hear the signal at the highest quality afforded by the GSM codec. Essentially, the first and second participants $204_1$ and $204_2$ respectively, will not hear as good a sound signal as they would if they were receiving a signal from a participant using a G.722 or G.729 codec. If the second participant $204_2$ speaks, the third participant $204_3$ will hear the voice signal at the highest quality afforded by using the GSM codec. This means that the third participant $204_3$ will hear as good a signal as if he/she were speaking to another participant using the GSM codec. Meanwhile, the first participant $204_1$ will only hear a signal at the quality afforded by the G.729 codec. If the first participant $204_1$ speaks, then all participants will hear the voice signal at their endpoint's respective quality. This occurs because the first participant $204_1$ is using the highest quality codec among all participants of the conference.

Now assume that a fourth party was also participating in the conference that has an endpoint enabled with the G.722 codec. The 4th participant $204_4$ will be able to hear any signal sent from the first participant $204_1$ at the quality afforded by the G.722 codec. However, the 4th participant $204_4$ will experience the conference in a similar fashion to that of the first participant $204_1$. Additional participants may engage in the conference for up to N participants. Furthermore, participants may be dynamically added/removed throughout the duration of a given conference.

As used herein, "codec" refers to any type of coding/decoding and/or compression/decompression scheme or algorithm implement by hardware or software to transmit a signal across a communication network. The characteristics of codecs may vary according to required bandwidth, sampling frequency, quantization level, and any other way the codec is designed (e.g., incorporates echo canceling, silence, sound suppression, etc.) A codec may differ from another codec in one or more of the above noted aspects and therefore may afford a different level of transmission/reception quality during the conference. The inventive aspects of the present invention are not limited to speech codecs (e.g., G.722, G.729, G.728, G.726, G.723.1, G.711, GSM, iLBC, Speex, DV Audio, ACELP.net, ACELP.wide, and their variants.) Embodiments of the present invention may be implemented for a conference using audio codecs (e.g., AAC, WMA, MP3, ACELP.live, AIFF, and their variants) and/or video codecs (e.g., MPEG, AVI, WMV, H.261, H.263, H.264, and their variants). Embodiments of the present invention also allow each user participating in a conference to receive signals (e.g., voice, image, video, and combination thereof) at the highest possible quality. Furthermore, embodiments of the present invention may be used in codecs that are still under development or have yet to be conceived.

Figure 4:
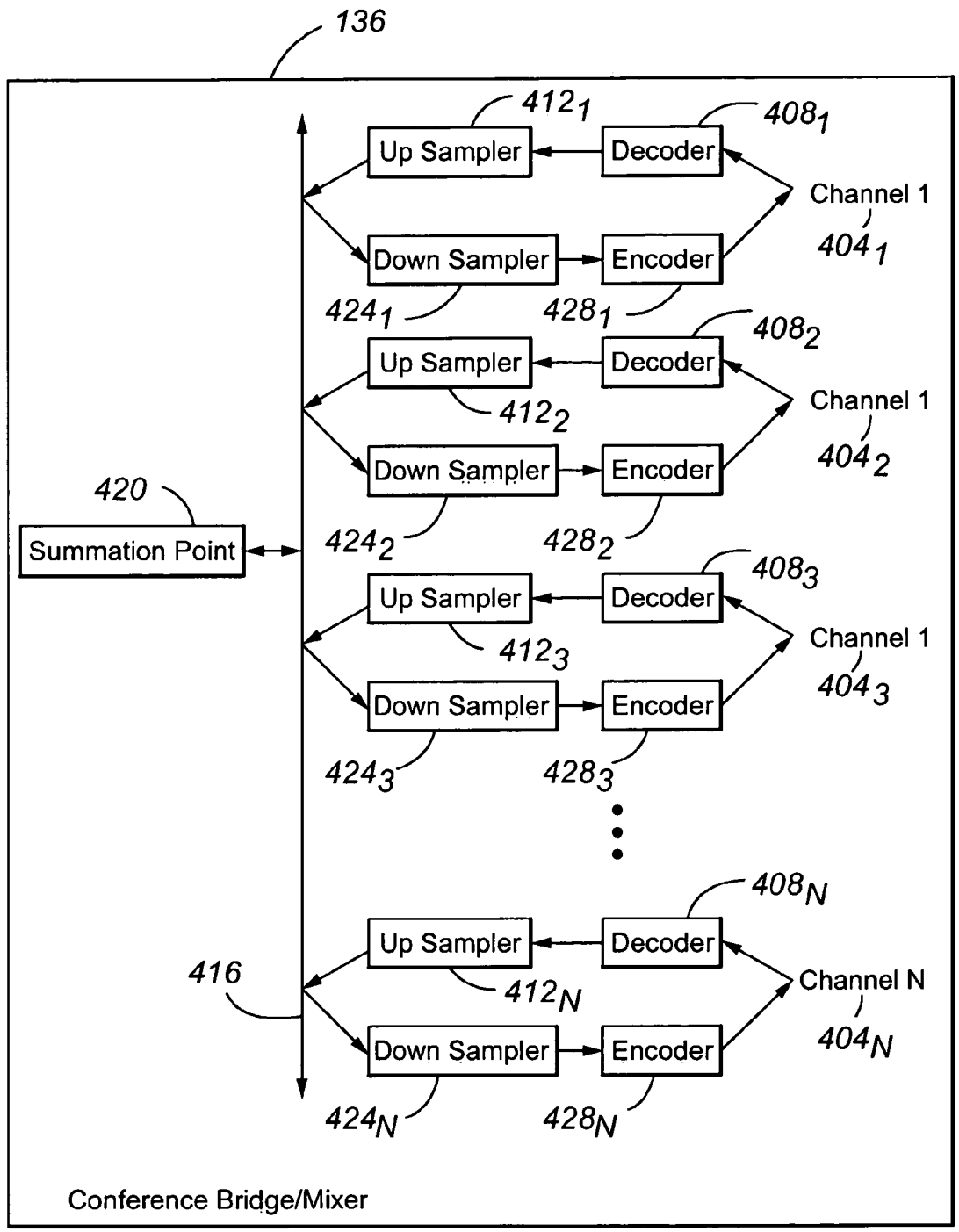
FIG. 4 is a block diagram depicting conferencing components in accordance with embodiments of the present invention.

Referring now to FIG. 4 the operation of the conference bridge 136 will be described in accordance with embodiments of the present invention. As noted above, the functions of the conference bridge 136 may also be implemented within a mixer at a given endpoint or may, for instance, be implemented at a server, for example at an enterprise server 132. In the depicted embodiment, the conference bridge 136 includes a plurality of channels $404_{1-N}$ from each participant, each channel can be connected through the packet network to a different endpoint and a summation point 420. Each channel comprises a decoder 408, an up sampler 412, a down sampler 424, and an encoder 428, at least one of which may typically be included as a part of the normalizer 140. Between the summation point 420 and each channel $404_{1-N}$ is a common channel 416 where signals from each channel $404_{1-N}$ are in a normalized state (e.g., are each at the same frequency, bandwidth, quantization level, and format).

The connection between an up sampler 412 and the summation point 420 may be realized as a set of individual connections between each channel's up sampler 412 and the summation point 420, or may be implemented as a hardware or software communications bus and/or switching matrix. Likewise, the connection between a down sampler 424 and the summation point 420 may be realized as a set of individual connections between each channel's down sampler 424 and the summation point 420, or may be implemented as a hardware or software communications bus and/or switching matrix.

In operation, the data structure 300 is referenced to determine how a particular signal should be processed in order to normalize it with all other signals. Typically, signals received that were generated using relatively lower quality codecs are processed to at least match the characteristics of the decoded signals received that were generated using the highest quality codec. A signal is passed through the decoder 408 and decoded if necessary. Once the signal is in a decoded form, it is processed by the up sampler 412, if necessary, and then is considered a normalized signal. The process of up sampling takes the initial signal-sampling rate to a normalized sampling rate. The normalized sampling rate may be substantially equal to the highest sampling rate of any codec that is being used in the conference or it may be higher than the sampling rate of any codec that is being used. For example, if some codecs in a conference sample at 8 kHz and others sample at 16 kHz, the frequency to which all signals are up sampled may be 16 kHz or greater. Essentially, null samples are inserted to the signal to convert it to the normalized signal format. For example, if the highest quality codec being used is the G.722 codec and the normalized signal is chosen to be 16 bits at 16 kHz, any signal that was generated using a codec that samples at 8 kHz (and possibly a different quantization level) will be processed to at least emulate the G.722 codec that samples at 16 kHz. A filter, for example an anti-aliasing filter, is then used to interpolate the inserted null samples and provide a resulting normalized signal to the summation point 420. Any type of suitable digital filter may be used, for instance, a Finite Impulse Response (FIR) filter, an Infinite Impulse Response (IIR) filter, or other type of anti-aliasing filter.

To normalize the bandwidth of each incoming signal, the sub-band nature of a wideband signal, for example the G.722, may be used by adding dummy bits to adapt to a normalized signal. The G.722 codec is a wideband signal comprising a high band and a low band. Conversations between endpoints both utilizing a wideband codec will result in a high fidelity communication using the wideband signal. However, a user utilizing a narrow band endpoint will not be able to receive the entire wideband signal. Instead only the content from the low band of the wideband signal is sent on to the endpoint using a narrow band codec. Likewise, a signal sent from the narrow band codec enabled endpoint will have a dummy high band inserted into the signal before it is forwarded on to the wideband endpoints. This allows the narrowband users and the wideband users to converse with each other despite their codec's bandwidth differences.

Additionally, to normalize the quantization level, more bits are used to represent samples. Essentially, when more bits are used to represent samples of a given signal, the accuracy, i.e. the quality, is higher than a signal that is using fewer bits to represent the same number of samples. Thus, to normalize a signal that originated from an endpoint utilizing a lower quantization level for transmission to an endpoint using a higher quantization level, additional dummy bits that do not represent any samples may be inserted in order to create a normalized signal.

All of the normalized signals may be summed at the summation point 420. The summation point 420 may be a centralized point as depicted, or may be implemented as a different summation point for each channel of the conference bridge 136. Furthermore, the functions of the summation point 420 may be implemented in various other devices throughout the communication network 100. For example, each endpoint may make use of its own summation point. Likewise, distribution of the summation point 420 through the network may result in a distribution of other functions of the conference bridge 136.

After summation of the normalized signals, the resulting signals are processed by the down sampler 424 at each channel 404, if necessary, and encoded, if necessary, by the encoder 428 in the desired format for transmission from the bridge back to the endpoints, which could be phones, gateways, or the like, associated with each channel. In the instance that the coder and decoder are of the same type, the process of down sampling is the reversal of up sampling. Namely, every other sample, i.e., each previously inserted samples, is removed (e.g., decimated) from the signal, if so necessary, to match the coder input requirements. Another anti-aliasing filter may be used to perform additional signal processing, if necessary, for example to execute inverse operations conducted at the receive path. If all parties in the conference use the same best codec, then everyone will experience the best possible quality and little to no signal processing will be necessary to normalize each signal prior to summation. However, if some parties using a lower quality codec are present in a conference with another group of users all having relatively higher quality codecs, any conversation between parties with the higher quality codec will be experienced by high quality codec users at the maximum quality. The parties with the lower quality codec will hear the signal at their respective lower quality level. This is made possible because every signal is normalized to the highest quality level prior to summation, and then retransmitted back to each participant at his or her respective codec quality level.

As can be appreciated, portions of the depicted conference bridge 136 may be implemented in hardware, software, firmware, and combinations thereof. Various parts of the depicted conference bridge 136 may be implemented in different devices throughout the communications network 100.

Figure 5:
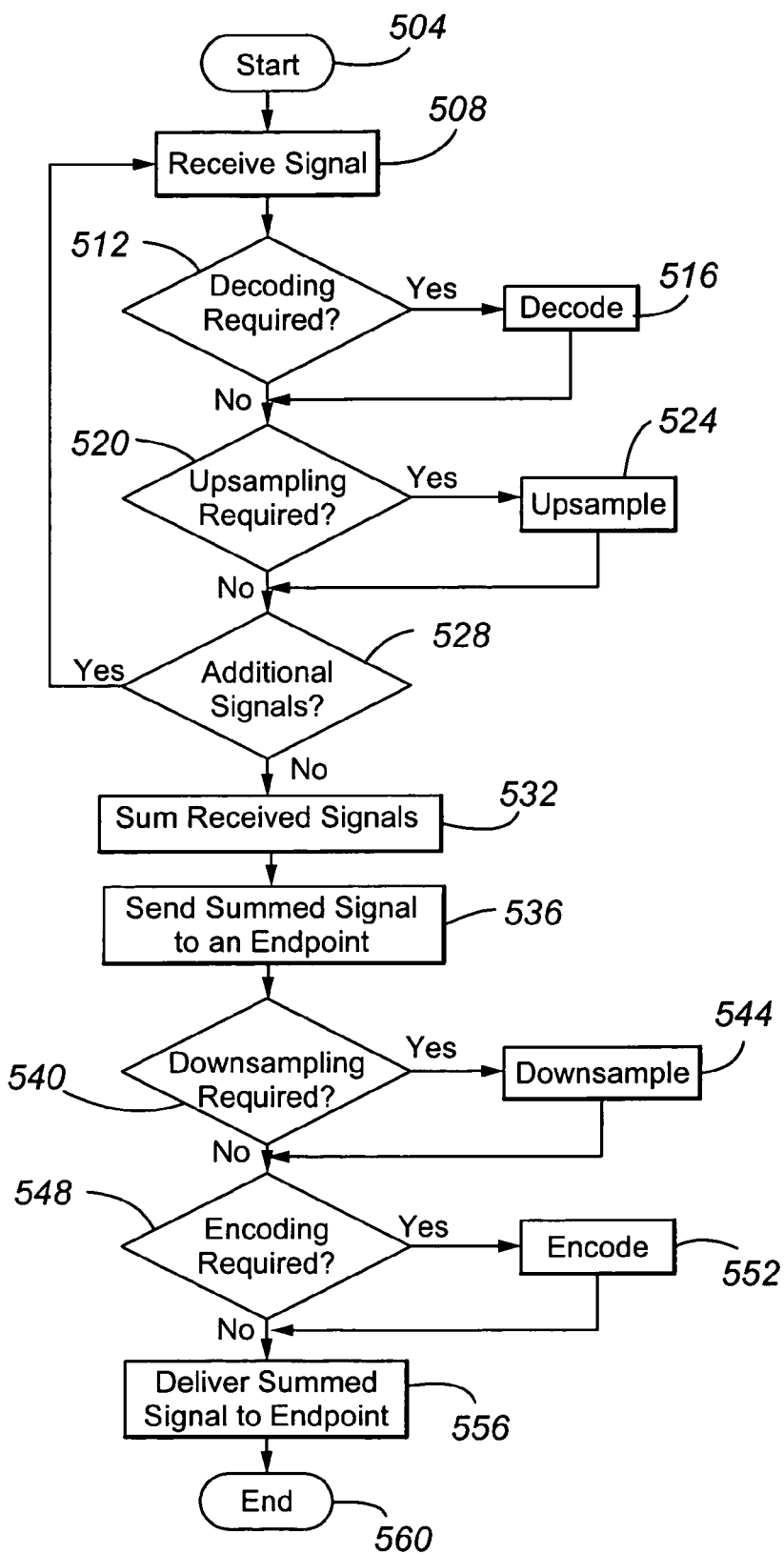
FIG. 5 is a flow chart depicting a method of transmitting a received signal to participants of a conference at the highest possible quality in accordance with embodiments of the present invention.

Referring now to FIG. 5 a method of normalizing signals in a conference or even a broadcast will be described in accordance with embodiments of the present invention.

In step 504 the process begins and the conference is initiated as noted above. The participants are identified along with their respective available codecs. A codec is also assigned to the each participant and the assigned codec is preferably the highest quality codec that the endpoint can use. Alternatively, the codec assigned to the endpoint may be limited by network constraints. Examples of network functions that may constrain the type of codec available for use by a particular endpoint include, bandwidth management systems, call processing systems, and the like. Furthermore, an endpoint may use the same codec for sending and receiving information. However, an endpoint may be assigned one codec type for sending data and a second codec type for receiving data.

In step 508, a signal is received from one of the endpoints. In step 512, the conference bridge 136 determines if the received signal is in encoded form. If the received signal is in encoded form, then the signal is decoded by the decoder 408 (step 516). However, if the signal is received in a decoded form, then it does not have to be decoded.

In step 520 the conference bridge 136 determines if up sampling is required. If the received signal was sampled at a lower frequency than the normalized signal frequency participating in the conference, the up sampler 412 will then up sample the received signal (step 524). However, if the received signal was sampled at a frequency essentially equal to the normalized signal frequency then no up sampling is necessary to normalize the received signal.

In step 528, it is determined if any additional signals need to be added to the conference at the same time as the previously received signal.

In step 532, all of the now normalized signals are summed together at the summation point 420. As noted above, the summation creates a different summed signal for each intended recipient. For example, a first participant receives a summation of all signals received at the conference bridge 136 with the exception of the signal generated by the first participant, a second participant receives a summation of all signals received at the conference bridge 136 with the exception of the signal generated by the second participant, and so on.

As can be appreciated, it is preferred to keep the summation step as simple as possible to minimize processing requirements. However, more sophisticated summation processes can be envisioned that will lead to substantially the same result. For example, if no substantial voice signals are detected on a particular channel for some time, then the conference bridge 136 may selectively not sum any part of the received signal from that channel for the duration that no speech is detected from that channel. This will eliminate unnecessary noise from channels that do not have a person speaking at the time.

In step 536, the summed signal is delivered to each respective endpoint. In order to send the signal back to each endpoint the normalized summed signal must be reformatted for the codec that a particular endpoint is using.

In step 540 the conference bridge 136 determines if down sampling is required to convert from the normalized signal back to a signal that can be handled by the codec being employed by a given endpoint. As noted, down sampling is required for codec's having lower sampling rates than the normalized sampling rate. If down sampling is required, then the down sampler 424 down samples the signal to eliminate samples corresponding to the null values that were previously inserted by the up sampler 412 (step 544).

In step 548, the conference bridge 136 determines if encoding is necessary (i.e., in order to transmit the signal across the network 104). If encoding is necessary, then the signal is encoded by the encoder 428 (step 552). Once the signal is back to the form suitable for transmission to the endpoint, the signal is delivered to the endpoint in step 556, and the process ends at step 560.

This process may be repeated if additional parties are added at some point during the conference. Furthermore, as can be appreciated by one of skill in the art, parties may selectively leave a particular conference in which case the channel associated with that party would no longer be in use.

Figure 6:
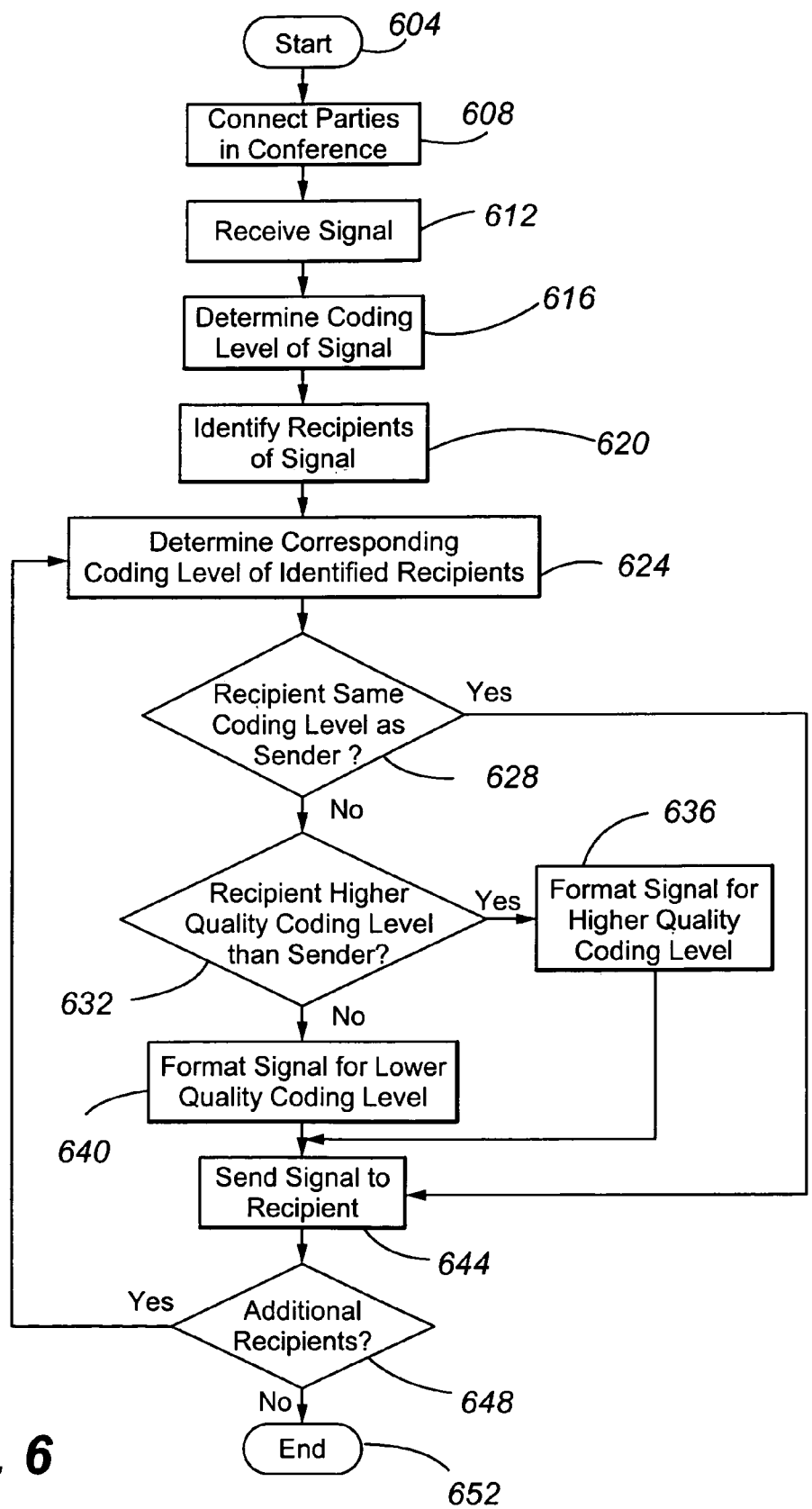
FIG. 6 is a flow chart depicting a method of transmitting a number of received voice signals to participants of a conference call at the highest allowable quality in accordance with embodiments of the present invention.

Referring now to FIG. 6, a method of receiving and transmitting signals (e.g., in a broadcast or other type of alternative conference transmission configuration) to participants of a conference at the highest possible codec quality level will be described in accordance with embodiments of the present invention.

At step 604, the process begins, then in step 608 the parties of the conference are connected. In this step, the conference bridge 136 (or mixer) connects to each party and creates a common connection point for all parties. Also during the connecting step, the conference bridge 136 determines what types of codecs, if any, each participant is capable of using (possibly after codec negotiation). The conference bridge 136 then populates the data structure 300 to reflect what codec each participant will use during the conference. The populated data structure 300 enables the normalizer 140 to know what processing steps it needs to perform on various channels to normalize the signal from each channel. The information also determines what processing steps are required when a signal is to be sent back to each endpoint. The type of codec used for receiving does not necessarily have to match the type of codec that is used for sending.

In step 612, a signal is received at the conference bridge on one of the channels. Thereafter the conference bridge 136 references the data structure 300 to determine what codec that particular channel is using (step 616).

In step 620, the conference bridge 136 identifies the recipients of the received signal. Typically each party that did not transmit the signal will receive the signal. The conference bridge may determine who sent the signal by channel detection, voice recognition, or other measures, and may distribute the received signal to the other parties based on this determination.

In step 624, the conference bridge 136 determines the corresponding codecs that each identified recipient is using by referencing the data structure 300. Then in step 628, the determination is made if a first intended recipient is using the same codec as the sender. If both parties are using the same codec, then the signal may be sent directly to that recipient without additional processing (step 644). However, if the codecs used by the sender and the first recipient is not the same then it is determined if the recipient is using a higher quality codec than the sender (step 632). If this is the case then the signal will be formatted such that the higher quality codec may be used (step 636). As noted above, this quality level is limited by the sender's codec quality. Once the signal has been formatted for the receiver's codec, then the signal can be sent to the recipient (step 644). The recipient having a higher quality codec than the sender will hear the signal at the sender's codec quality level.

If the receiver does not have the same or higher quality codec than the sender then the receiver has a lower quality codec than the sender. In this case the signal will be formatted for the lower quality codec (step 640). The reformatted signal is then sent to the signal recipient (step 644). The recipient will be able to hear the signal at the best quality afforded by his or her codec.

In step 648, it is determined if any additional recipients exist that have not yet received the signal. If there are still additional recipients then the process returns to step 624, so that each participant may receive the signal at the highest possible quality. If there are no additional recipients, the process ends in step 652.

As can be appreciated various components that have been depicted in the conference bridge 136 may be implemented in various other parts of the communication network 100 in accordance with embodiments of the present invention. Furthermore, the functions of the conference bridge 136 may be performed by these various components as well.

Advantages provided by embodiments of the present invention may also be realized in video and/or audio streams utilizing various types and qualities of codecs. A first participant in a videoconference may be using a first codec having a first quality while other participants in the videoconference may be using codecs having a lesser quality. Signals from each participant are normalized prior to being retransmitted to other participants in the videoconference. This enables each participant to use the highest quality codec available to their communication device, thus resulting in a better conference experience.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A signal processing method, comprising:

for each endpoint participating in a communication session, a processor, at a conference bridge, selecting a codec that a selected endpoint is enabled to use, wherein at least first second, and third endpoints are included in the communication session, wherein the first endpoint uses a first codec and a first sampling frequency, wherein the second endpoint uses a second codec and a second sampling frequency, wherein the third endpoint uses at least one of (a) the first codec and the first sampling frequency and (b) a third codec and a third sampling frequency, wherein the second sampling frequency is higher than the first sampling frequency, wherein the second sampling frequency is higher than the third sampling frequency, and wherein the second sampling frequency is the highest sampling frequency;

the processor receiving a first signal from the first endpoint using the first codec;

the processor decoding the first received signal;

the processor up-sampling the first decoded-signal to create a first normalized signal having a normalized sampling frequency, wherein the normalized sampling frequency is equal to the second sampling frequency;

the processor receiving a second signal from the second endpoint using the second codec;

the processor decoding the second received signal, wherein the second received signal is a second normalized signal having the normalized sampling frequency;

the processor receiving a third signal from the third endpoint using one of the first codec and the third codec;

the processor decoding the third received signal;

the processor up-sampling the third decoded signal to create a third normalized signal having the normalized sampling frequency;

the processor summing the first, second, and third normalized signals;

the processor forwarding, to the first endpoint, a first summed signal using the first codec that includes the second received signal and the third received signal, wherein the first summed signal has the first sampling frequency;

the processor forwarding, to the second endpoint, a second summed signal using the second codec that includes the first received signal and the third received signal, wherein the second summed signal has the second sampling frequency; and the processor forwarding, to the third endpoint, a third summed signal using one of the first codec and the third codec that includes the first received signal and the second received signal, wherein the third summed signal has one of the first sampling frequency and the second sampling frequency.

2. The method of claim 1, wherein, in the up-sampling step, null samples are inserted into the first signal to create the up-sampled signal.

3. The method of claim 2, wherein prior to forwarding the first summed signal to the first endpoint the processor down-samples the first summed signal to the first frequency, wherein the down-sampled signal has at least some samples removed from the up-sampled signal.

4. A non-transitory computer readable medium comprising processor executable instructions to perform the steps of claim 1.

5. A method of facilitating a communication session, comprising:
   for each endpoint participating in a communication session, a processor selecting a codec that the selected endpoint is enabled to use, wherein at least first, second, and third endpoints to the session have selected first, second, and third codecs, respectively, wherein the first codec has a first sampling frequency, the second codec has a second sampling frequency, and the third codec has a third sampling frequency, wherein the second sampling frequency is higher than the first and third sampling frequencies, wherein the first codec has a first quality, the second codec has a second quality, and the third codec a third quality, wherein the first quality, the second quality, and the third quality are different, and wherein the second quality is higher than the first and third qualities;
   the processor receiving a first signal from the first endpoint using the first codec;
   the processor receiving a second signal from the second endpoint using the second codec;
   the processor receiving a third signal from the third endpoint using the third codec;
   the processor converting the first signal to the second sampling frequency;
   the processor converting the third signal to have the second sampling frequency;
   the processor summing the converted first signal, and the converted third signal into a first normalized signal having the second sampling frequency;
   the processor summing the converted first signal and the second signal into a second normalized signal having the second sampling frequency;
   the processor summing the converted third signal and the second signal into a third normalized signal having the second sampling frequency;
   the processor forwarding the first normalized signal to the second endpoint using the second sampling frequency and the second codec;
   the processor converting the second normalized signal to the third sampling frequency and forwarding the converted second normalized signal to the third endpoint; and
   the processor converting the third normalized signal to the first codec and the first sampling frequency and forwarding the converted third normalized signal to the first endpoint using the first codec.

6. The method of claim 5, wherein the first signal characteristic comprises at least one of a sampling frequency, a quantization level, and a bandwidth.

7. The method of claim 6, wherein the second signal characteristic is a lower sampling frequency.

8. The method of claim 7, wherein the third quality is lower than the second quality and higher than the first quality, and wherein converting the normalized signal comprises:
   down-sampling the normalized signal to form the third signal having a third quality; and
   forwarding to the third endpoint the third signal.

9. The method of claim 8 wherein the normalized signal comprises additional samples when compared to the first signal.

10. The method of claim 9, wherein the third signal has at least some of the additional samples removed when compared to the normalized signal.

11. The method of claim 8, wherein the normalized signal has a same quality as the second signal.

12. The method of claim 6, wherein the first signal is a first wide band signal, wherein the first signal characteristic is bandwidth, wherein the normalized signal is a second wide-band signal, and wherein the third endpoint is configured for narrow band signals, and further comprising:
   converting the normalized signal into a second narrow band signal, wherein the second narrow band signal includes information from a low band of the normalized signal; and
   forwarding, to the third endpoint, the second narrow band signal.

13. The method of claim 6, wherein the one or more characteristics is quantization level, wherein the first signal has a higher quantization level than the third endpoint, and further comprising:
   reducing a number of bits of the normalized signal to create the third signal; and
   forwarding, to the third endpoint, the third signal.

14. A non-transitory computer readable medium comprising processor executable instructions to perform the steps of claim 5.

15. A device, comprising:
   a memory;
   a processor in communication with the memory, the processor operable to execute:
     at least three channels, each channel associated with an endpoint, each endpoint utilizing a codec, wherein at least two of the endpoints utilize a different codec;
     a normalizer that is operable, during a multi-endpoint communication session, to normalize a signal received from each of the at least three channels to form normalized signals such that the normalized signals possess at least the same characteristics as a signal received from an endpoint utilizing a highest quality codec;
     a summation member operable to sum each of the normalized signals to form a summed signal; and
     wherein the normalizer is further operable to process the summed signal for each of the at least three channels to form a processed summed signal such that the processed summed signal can be received by each endpoint associated with each of the at least three channels.

16. The device of claim 15, wherein the characteristics comprise at least one of a sampling frequency, a quantization level, and a bandwidth.

17. The device of claim 16, wherein the characteristic is a higher sampling frequency.

18. The device of claim 16, wherein the communication session is a conference call involving first, second, and third endpoints, wherein the first endpoint has a first codec of a first quality, wherein the second endpoint has a second codec of a second quality, wherein the third endpoint has a third codec of a third quality, wherein the first quality is lower than the second quality, and wherein the third quality is lower than the second quality and higher than the first quality, and wherein the normalizer is operable to:

down-sample the normalized signal to form a third signal having the third quality; and forward, to the third endpoint, the third signal.

19. The device of claim 18, wherein the normalized signal is an up-sampled version of a first signal received from the first endpoint and the normalized signal comprises null samples when compared to the first signal.

20. The device of claim 19, wherein quality is measured using MOS characteristics.

21. The device of claim 16, wherein a first signal received from a first endpoint is a wide band signal, wherein the at least one characteristic is bandwidth, wherein the normalized signal is a wideband signal, wherein the communication session is a conference call involving the first and second and third endpoints, wherein the third endpoint is configured for narrow band signals, and wherein the normalizer is operable to convert the normalized signal into a second narrow band signal, wherein the narrow band signal includes information from a low band of the normalized signal, and forward, to the third endpoint, the second narrowband signal.

22. The device of claim 16, wherein a first signal received from a first endpoint comprises a first quantization level, wherein the characteristics comprise quantization level, wherein the normalized signal comprises a second quantization level that is at least as high as the first quantization level, wherein the communication session is a conference call involving the first, second, and third endpoints, wherein the third endpoint is configured to receive signals having a third quantization level that is lower than the second quantization level, and wherein the normalizer is operable to convert the normalized signal into a third signal having the third quantization level and forward, to the third endpoint, the third signal.

* * * * *